(12) United States Patent
Lee et al.

(10) Patent No.: US 6,844,108 B1
(45) Date of Patent: Jan. 18, 2005

(54) ULTRAMINIATURIZED RESERVE BATTERY CELL

(75) Inventors: Won-Bae Lee, Taejeon (KR); Han Chung, Kyungki-do (KR); Ho-Jun Lee, Taejeon (KR)

(73) Assignee: Seju Engineering Co., Ltd., Taejeon (KR)

( * ) Notice: Subject to any disclaimer, the term of this patent is extended or adjusted under 35 U.S.C. 154(b) by 0 days.

(21) Appl. No.: 09/744,951

(22) PCT Filed: Aug. 5, 1999

(86) PCT No.: PCT/KR99/00437

§ 371 (c)(1),
(2), (4) Date: Apr. 26, 2002

(87) PCT Pub. No.: WO00/08699

PCT Pub. Date: Feb. 17, 2000

(30) Foreign Application Priority Data

Jun. 8, 1998 (KR) .......................................... 98-32068

(51) Int. Cl.[7] .............................. H01M 6/30; H01M 6/38
(52) U.S. Cl. .......................... 429/116; 429/110; 429/52; 429/176
(58) Field of Search ................... 429/52, 110, 113–118, 429/163, 176

(56) References Cited

U.S. PATENT DOCUMENTS

| | | | |
|---|---|---|---|
| 2,852,592 A | | 9/1958 | Salauze |
| 3,445,295 A | | 5/1969 | Smith et al. |
| 3,839,092 A | | 10/1974 | Häusler et al. |
| 3,929,508 A | * | 12/1975 | Merz .......................... 429/116 |
| 4,049,888 A | | 9/1977 | Flender |
| 4,065,606 A | | 12/1977 | Casson |
| 4,446,211 A | | 5/1984 | Goebel et al. |
| 4,968,567 A | * | 11/1990 | Schisselbauer ............... 429/90 |

FOREIGN PATENT DOCUMENTS

| | | |
|---|---|---|
| JP | 48-35381 | 10/1973 |
| JP | 3-119957 | 12/1991 |

OTHER PUBLICATIONS

Linden. Handbook of Batteries, 2nd edition, pp. 17.8–17.9. 1995 no month.*
English Language Abstract of JP 3–119957, Dec. 1991.
English Language Abstract of JP 48–35381, Oct. 1973.

* cited by examiner

*Primary Examiner*—Patrick Ryan
*Assistant Examiner*—Tracy Dove
(74) *Attorney, Agent, or Firm*—Greenblum & Bernstein, P.L.C.

(57) ABSTRACT

To compliment the drawback of the conventional large-size reserve battery cell inapplicable to a small electronic system, disclosed is a super-slim reserve battery cell sized merely several millimeters in its entirety including micro-size battery elements sized about several $\mu$m by using a micromachining technology of processing mechanical structures in a super-slim size. The present invention realized electrolyte container and other battery elements by using materials such as silicon, nickel, copper, aluminum, etc. to form a membrane structure of relatively thinner thickness than the periphery in an electrolyte container contiguous with the battery cell that is broken only when activating the cell. Therefore, it is possible to activate the battery cell with less power while securing sufficient impact-resistant characteristics under normal circumstances.

10 Claims, 3 Drawing Sheets

ULTRAMINIATURIZED RESERVE BATTERY CELL

TECHNICAL FIELD

The present invention relates to a battery, and in particular, to a reserve battery cell activated to generate electric energy only when a user takes intentional actions.

In general, a battery comprises anode/cathode active materials and electrolyte generating electric energy by chemically reacting therewith. Unlike a primary/secondary battery, in which electrolyte is in contact with anode/cathode active materials under normal circumstances, a reserve battery initiates a role as a battery by mechanically breaking a separate closed container containing the electrolyte so that the electrolyte reacts with the active materials. Electrolyte is completely separated from the active materials in such a reserve battery cell. Thus, a reserve battery cell does not pose a problem of current leakage, unlike an ordinary battery cell, and can be retained for a long period of time. Moreover, the active materials and electrolyte of the reserve battery cell is very fresh at an initial stage of its usage, thereby creating no phenomenon of voltage retardation. For this reason, reserve battery cells occupy a major portion of the battery market as an emergency power supply or an energy source requiring a long retention period.

BACKGROUND ART

In the conventional reserve battery cell, electrolyte is generally retained in a ampoule made of glass. However, the glass ampoule can be manufactured to have a size at least longer than a centimeter with a thickness greater than hundreds of $\mu$. Further, the shape of the glass ampoule is limited to a cylindrical shape. Therefore, the conventional reserve battery cells can be manufactured at a large size only, and a relatively stronger power is required to mechanically destroy the ampoule. Hence, the conventional reserve battery cells have a drawback of being inapplicable to a small electronic system requiring activation of a super-slim battery with less power.

SUMMARY OF THE INVENTION

It is, therefore, an object of the invention to provide a super-slim reserve battery cell applicable to a small electronic system and can be activated with a slight power.

To achieve the above and other objects, there is provided a reserve battery cell, comprising: a battery cell including a first electrode and a second electrode spaced by a separating member (the separating member is composed of a material absorbing electrolyte when the battery cell is activated); an electrolyte housing mounted on the battery cell for containing the electrolyte; a supporting member provided on a lower plate of the battery cell so as to be in electrical contact with the first electrode; a first sealing member composed of an insulating body for sealing side surfaces of the battery cell; a first membrane provided on a partial region of the electrolyte housing contiguous with the battery cell and has a relatively thinner thickness than the electrolyte housing; and a membrane-breaking member for breaking the first membrane to lead the electrolyte into the battery cell.

To compliment the drawback of the conventional large-size reserve battery cell inapplicable to a small electronic system, the present invention realized a super-slim reserve battery cell sized merely several millimeters in its entirety including micro-size battery elements sized about several $\mu$m by using a micro-machining technology of processing mechanical structures in a super-slim size. To be specific, the present invention realized electrolyte container and other battery elements by using materials such as silicon, nickel, copper, aluminum, etc. to form a membrane structure of relatively thinner thickness than the periphery in an electrolyte container contiguous with the battery cell that is broken only when activating the cell. Therefore, it is possible to activate the battery cell with less power while securing sufficient impact-resistant characteristics under normal circumstances.

The present invention is also directed to a reserve battery cell comprising an electrolyte container for containing electrolyte; a reaction container connected to the electrolyte container for generating an electromotive force with the electrolyte provided by the electrolyte container upon reception of an external impact, the reaction container including a wall separating the electrolyte container and the reaction container, the wall including a first membrane of a relatively thinner thickness easily breakable upon reception of the external impact, a surface of the reaction container facing the first membrane including a second flexible membrane of a relatively thinner thickness, a membrane for breaking the first membrane protrudes toward the first membrane from an inner wall of the second membrane, and the first and the second membranes have a thickness less than 20 $\mu$m, respectively.

The present invention is also directed to a reserve battery cell, comprising an electrolyte container for containing electrolyte; a reaction container including a first membrane formed on a region of a wall separating the electrolyte container from the reaction container and a second membrane formed on a surface of the reaction container facing the first membrane; and a member provided on an external surface of the reaction container for breaking the first and the second membranes upon reception of an external impact to activate the battery cell.

The present invention is also directed to a reserve battery cell, comprising an electrolyte container for containing electrolyte; a reaction container including a first membrane formed on a region of a wall separating the electrolyte container from the reaction container and a second, flexible membrane formed on a surface of the reaction container facing the first membrane and not extending past an outer surface of the reaction container; and a member protruding toward the first membrane from an inner wall of the second membrane, said member being positioned within the reaction container and capable of breaking the first membrane so as to lead the electrolyte into the reaction container for generating an electromotive force.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1A:
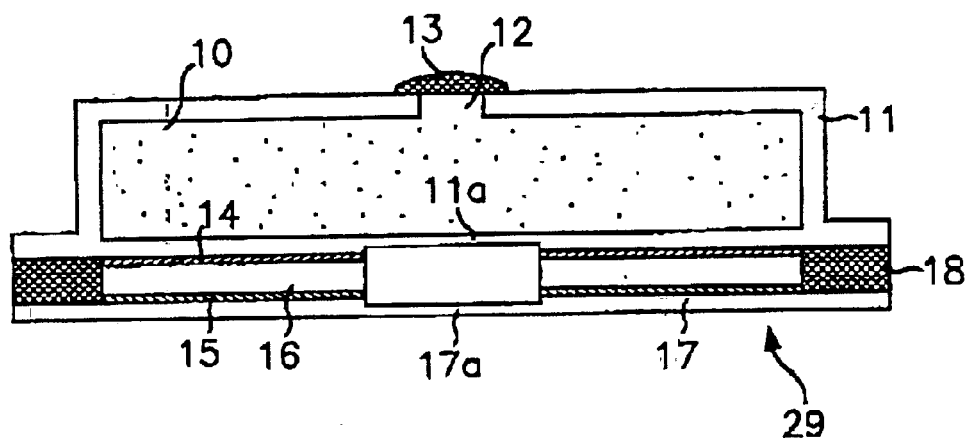
FIGS. 1A and 1B are cross-sectional views of a super-slim reserve battery cell in accordance with an embodiment of the present invention.
Figure 1B:
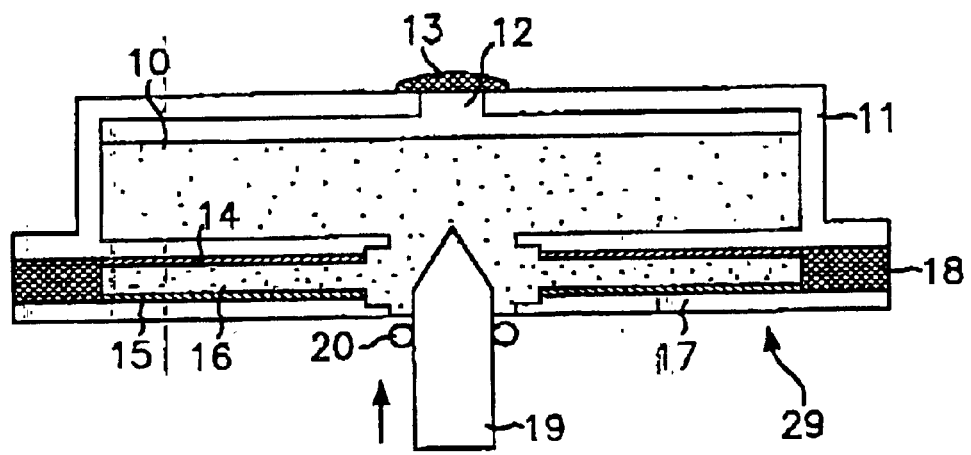

FIGS. 1A and 1B are cross-sectional views of a super-slim reserve battery cell in accordance with an embodiment of the present invention. In particular, FIG. 1A illustrates an inert state of the reserve battery cell, while FIG. 1B illustrates an active state of the reserve battery cell.

Referring to FIG. 1A, an electrolyte container 11 containing electrolyte 10 is composed of a conductive material including silicon, nickel, copper, aluminum, stainless steel, etc. An electrolyte injection inlet 12 is formed on an upper plate of the electrolyte container 11. A membrane structure 11a is formed on a power portion of the electrolyte container 11, i.e., at a center of a reaction container 29 generating electromotive force from the electrolyte 10.

Meanwhile, such a membrane structure is formed to be thinner than the contiguous lower plate by carving a part of the lower plate of the electrolyte container 11 with a micro-machining technology. Therefore, the membrane structure 11a may be composed of the same material as the lower plate of the electrolyte container 11. The electrolyte 10 is injected into the electrolyte container 11, and the injection inlet 12 is firmly sealed with a sealant 13 to retain the electrolyte 10 for a long period of time. Materials chemically not reactive with the electrolyte 10, such as epoxy resin, plastic resin, indium, etc., are used for the sealant 13. An anode material 14 is mounted beneath the lower plate of the electrolyte container 11 except the portion occupied by the membrane structure 11a so as to be in electric contact with the lower plate. Cathode materials 15 are spaced by a separator 16, which is composed of a nonconductor that can absorb the electrolyte 10 such as non-woven glass fiber, paper, etc. A lower plate 17, which includes a membrane structure 17a of a slim thickness and is electrically connected to the cathode materials 15, is formed at the center of the lowest portion of the battery cell.

Meanwhile, a vacant space exists between the membrane structures 11a, 17a of the upper and lower portions of the lower plate 17. The lower plate 17 may be composed of any one material selected from silicon, nickel, copper, aluminum and stainless steel. The periphery of the battery cell is sealed with the sealant 18 such as epoxy resin so as to protect the cathode materials 15 and the separator 16 from external environment. The battery cell shown in FIG. 1A is in inert state because the electrolyte 10 is separated from the electrodes 14, 15.

As shown in FIG. 1B, however, the central portion of the battery cell may be penetrated by an acute needle 19, depending on the user's will. Then, the needle 19 enters the battery cell by breaking the membrane structure 17a of the lower plate 17. If the needle 19 continuously breaks the membrane structure 11a of the lower plate of the electrolyte container 11, the electrolyte 10 is absorbed into the separator 16 to activate the battery cell. Since the penetration by the needle 19 is maintained while the battery cell is activated and in use, an external surface of the needle 19 should be composed of a nonconductive material. Moreover, in order to prevent leakage of the electrolyte out of the battery cell, an o-ring 20 may be attached to the needle 19. Other devices than the a-ring 20 may be mounted on the needle 19 or a lower end of the battery cell to prevent leakage of the electrolyte.

According to an embodiment of the present invention, it is preferable to employ: $SOCl_2$ solution for the electrolyte 10; lithium film of 0.05 thickness for the anode material 14; carbon (acetylene black) film of 0.2 mm thickness for cathode materials 15; and non-woven glass fiber of 0.1 mm thickness composed of glass fiber for the separator 16. It is also preferable to employ nickel of 0.1 mm thickness for the electrolyte container with its cubic size being 5.0 mm×5.0 mm×1.0 mm. The injection inlet 12 has a diameter preferably of 0.5 mm, and the membrane structure of the lower plate 17 of the electrolyte container 11 is designed to have a diameter preferably of 1.0 mm and a thickness preferably of 5.0 $\mu$m. The lower plate 17 generally composed of nickel has a thickness preferably of 0.1 mm. The membrane structure 17a of the lower plate 17 is designed to have a diameter preferably of 1.0 mm and a thickness preferably of 5.0 $\mu$m. The needle 19 for breaking the membrane structures 11a, 17a is preferably composed of any one element selected from silicon, ceramic, glass, nickel, copper and aluminum. The needle 19 is designed to have a diameter preferably smaller than that of the membrane structures 11a, 17a. If a conductive material such as nickel, aluminum or copper is to be employed for the needle 19, nonconductive material is coated on the needle 19 to prevent short circuit between the two electrodes. The electrolyte container 11 and the lower plate 17 of a microstructure such as the membrane structures 11a, 17a can be manufactured by using the micro-machining technology.

Figure 2A:
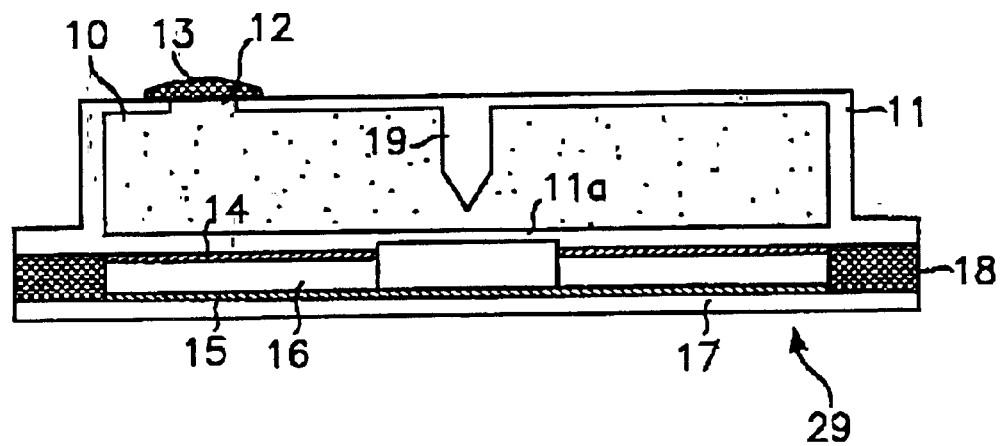
FIGS. 2A and 2B are cross-sectional views of a reserve battery cell in accordance with another embodiment of the present invention.
Figure 2B:
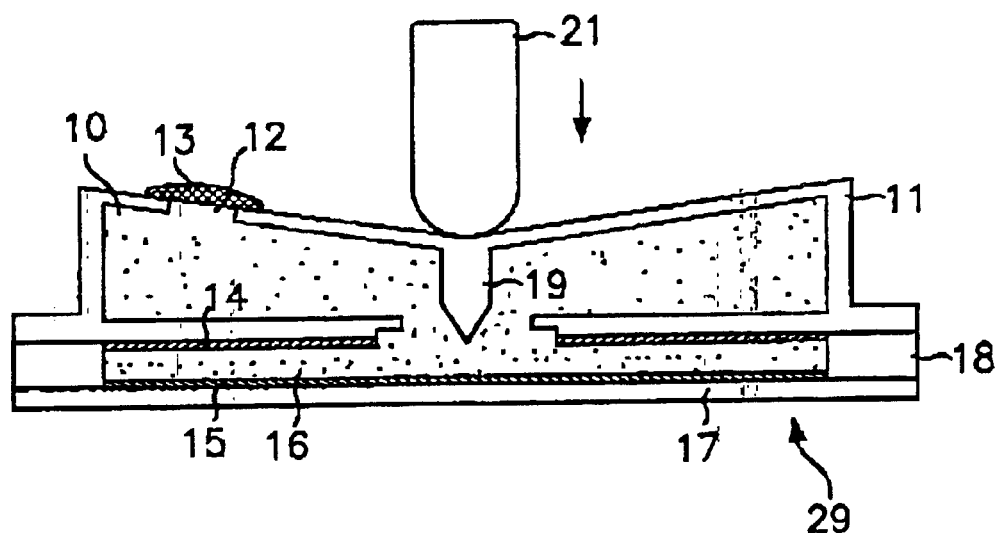

FIGS. 2A and 2B are cross-sectional views of a reserve battery cell in accordance with another embodiment of the present invention. The same drawing reference numerals as those in FIGS. 1A and 1B were used in FIGS. 2A and 2B for the identical elements. FIG. 2a illustrates an inert state of the reserve battery cell, while FIG. 2B illustrates an active state of the reserve battery cell.

Referring to FIG. 2A, the comprehensive structure of the battery cell is similar to that in FIG. 1A except that: no membrane structure is formed on the lower plate 17; the upper plate of the electrolyte container 11 is formed to have a thickness less than 50 $\mu$m so as to be slim and flexible; and the needle 19 is mounted on the central portion of the upper plate of the electrolyte container 11. Under an inert state of the battery cell, the needle 19 is slightly spaced from the membrane structure 11a of the lower plate of the electrolyte container 11, and is designed to have a smaller diameter than that of the membrane structure 11a.

As shown in FIG. 2B, if the central portion of the upper portion of the electrolyte container 11 is pressed by a stick 21, etc. according to the user's will, the membrane structure 11a of the lower plate of the electrolyte container 11 is broken to activate the battery cell. Since the upper plate of the electrolyte container 11 is flexible, the electrolyte container 11 is easily bent by even a slight power so that the needle 19 can break the membrane structure 11a of the lower plate of the electrolyte container 11. Also, the battery cell of this structure can be activated by an acceleration without any additional mechanical force such as pressure with a stick. In other words, the upper plate of the electrolyte 11 is bent by a force generated by an acceleration and a weight of the needle 19, and as a consequence, the needle 19 breaks the membrane structure 11a of the lower plate of the electrolyte container 11, thereby activating the battery cell.

Figure 3A:
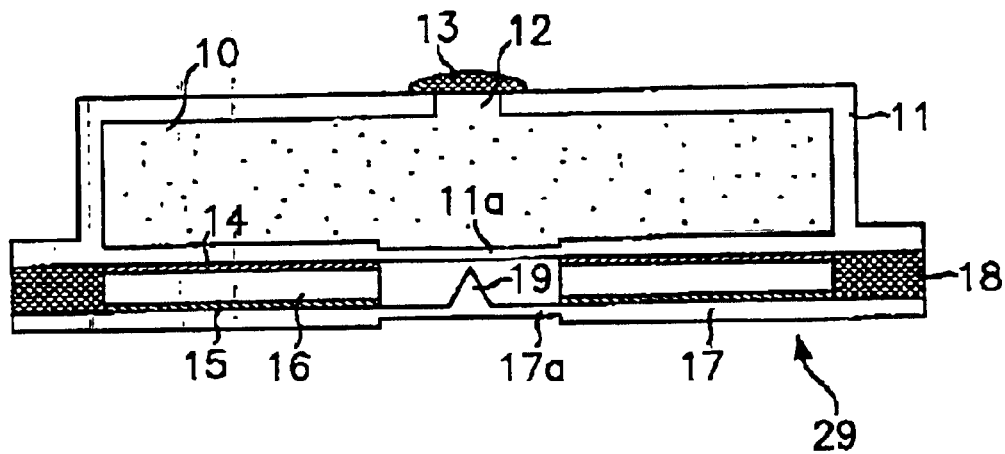
FIGS. 3A and 3B are cross-sectional views of a reserve battery cell in accordance with another embodiment of the present invention.
Figure 3B:
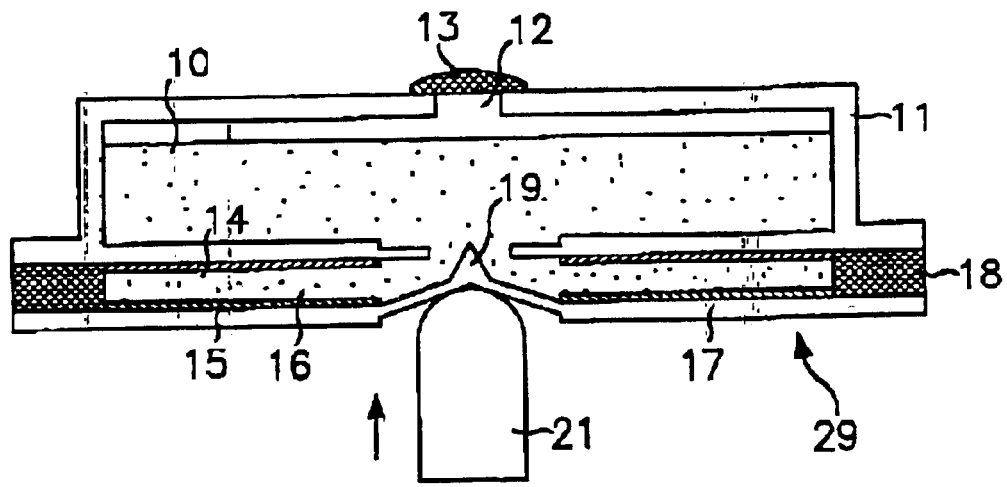

FIGS. 3A and 3B are cross-sectional views of a reserve battery cell in accordance with another embodiment of the present invention. The same drawing reference numerals as those in FIGS. 1A and 1B were used in FIGS. 3A and 3B for the identical elements. FIG. 3A illustrates an inert state of the reserve battery cell, while FIG. 3B illustrates an active state of the reserve battery cell.

Referring to FIG. 3A, the comprehensive structure of the battery cell is similar to that in FIG. 1A except that the needle 19 is mounted on the flexible membrane structure 17a of the lower plate 17. If the central portion of the lower plate 17 is pressed by the stick 21, as shown in FIG. 3B, the needle 19 breaks the membrane structure 11a of the lower plate of the electrolyte container 11 to activate the battery cell. Also, the battery cell of this structure can be activated by an acceleration without any additional mechanical force such as pressure with a stick.

The reserve battery cell according to other two embodiments of the present invention has an advantage of being dispensable with an additional device for preventing leakage of the electrolyte because the battery is activated without breaking an external surface thereof and no electrolyte is leaked outside as a consequence.

Further, the super-slim size of the reserve batter cell according to the present invention is suitable for an energy source of a small electronic system such as a sensor. The super-slim reserve battery cell according to the present invention also has a high impact resistance, and is easily activated by even a slight power.

While the invention has been shown and described with reference to certain preferred embodiments thereof, it will be understood by those skilled in the art that various changes in form and details may be made therein without departing from the spirit and scope of the invention as defined by the appended claims.

For instance, the above embodiments exemplified a case of setting the thickness of the membrane structure to be 5.0 $\mu$m. However, the principle of the present invention is applicable to the case when the thickness of the membrane structure is less than 20 $\mu$m. The technical principle of the present invention is also applicable to the case of switching the positions of the anode material and the cathode materials when necessary.

What is claimed is:

1. A reserve battery cell comprising:
    an electrolyte container for containing electrolyte;
    a reaction container connected to the electrolyte container for generating an electromotive force with the electrolyte provided by the electrolyte container upon reception of an external impact, the reaction container including a wall separating the electrolyte container and the reaction container, the wall including a first membrane of a relatively thinner thickness easily breakable upon reception of the external impact;
    a surface of the reaction container facing the first membrane including a second flexible membrane of a relatively thinner thickness;
    a member for breaking the first membrane protrudes toward the first membrane from an inner wall of the second membrane; and
    the first and the second membranes have a thickness less than 20 $\mu$m, respectively.

2. The reserve battery cell as recited in claim 1, further comprising a sealing member for sealing an electrolyte injection inlet provided on an upper surface of the electrolyte container.

3. The reserve battery cell as recited in claim 1, wherein the electrolyte container and the reaction container are respectively composed of a material selected from the group consisting of silicon, nickel, copper, aluminum and stainless steel.

4. The reserve battery cell as recited in claim 1, wherein the upper surface of the electrolyte container has a thickness less than 50 $\mu$m.

5. The reserve battery cell as recited in claim 1, wherein the member for breaking the first membrane is composed of a material selected from the group consisting of silicon, ceramic, glass, nickel coated with a nonconductive material, copper coated with a nonconductive material, and aluminum coated with a nonconductive material.

6. The reserve battery cell as recited in claim 5, wherein the member for breaking the first membrane is of a needle shape having a diameter smaller than a diameter of the first membrane.

7. The reserve battery cell as recited in claim 1, wherein the reaction container comprises a separating member provided between a first electrode formed on an inner wall of the upper portion thereof and a second electrode formed on an inner wall of the lower portion thereof to electrically insulate the first and the second electrodes when no electrolyte is led in, and to generate an electromotive force from the electrolyte between the first and the second electrodes.

8. A reserve battery cell, comprising:
    an electrolyte container for containing electrolyte;
    a reaction container including a first membrane formed on a region of a wall separating the electrolyte container from the reaction container and a second membrane formed on a surface of the reaction container facing the first membrane;
    a member provided on an external surface of the reaction container for breaking the first and the second membranes upon reception of an external impact to activate the battery cell; and
    wherein the first membrane and the second membrane have a thickness of less than 20 $\mu$m and the member is composed of a material selected from the group consisting of silicon, ceramic, glass, nickel coated with a nonconductive material, copper coated with a nonconductive material, and aluminum coated with a nonconductive material.

9. A reserve battery cell, comprising:
    an electrolyte container for containing electrolyte;
    a reaction container including a first membrane formed on a region of a wall separating the electrolyte container from the reaction container and a second, flexible membrane formed on a planar surface of the reaction container facing the first membrane and not extending past an outer surface of the reaction container; and
    a member protruding toward the first membrane from an inner wall of the second membrane formed on said planar surface, said member being positioned within the reaction container and capable of breaking the first membrane so as to lead the electrolyte into the reaction container for generating an electromotive force.

10. The reserve battery cell as recited in claim 9, wherein the first membrane and the second membrane have a thickness of less than 20 $\mu$m and the member is composed of a material selected from the group consisting of silicon, ceramic, glass, nickel coated with a nonconductive material, copper coated with a nonconductive material, and aluminum coated with a nonconductive material.

* * * * *

UNITED STATES PATENT AND TRADEMARK OFFICE
CERTIFICATE OF CORRECTION

PATENT NO. : 6,844,108 B1
DATED : January 18, 2005
INVENTOR(S) : W. Lee et al.

It is certified that error appears in the above-identified patent and that said Letters Patent is hereby corrected as shown below:

<u>Title page,</u>
Item [30], Foreign Application Priority Data, "June 8, 1998" should be -- August 6, 1998 --.

Signed and Sealed this

Twenty-third Day of August, 2005

JON W. DUDAS
*Director of the United States Patent and Trademark Office*